United States Patent [19]
Bowen et al.

[11] Patent Number: 6,046,730
[45] Date of Patent: *Apr. 4, 2000

[54] BACKLIGHTING SCHEME FOR A MULTIMEDIA TERMINAL KEYPAD

[75] Inventors: Donald John Bowen, Madison, Morris County; David Michael Britz, Rumson, Monmouth County; Richard Henry Erving, Piscataway, Middlesex County; Robert Raymond Miller, Morris Township, Morris County, all of N.J.

[73] Assignee: AT&T Corp, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/688,326

[22] Filed: Jul. 30, 1996

Related U.S. Application Data

[63] Continuation-in-part of application No. 08/616,871, Mar. 15, 1996.

[51] Int. Cl.[7] ...................................................... G06F 1/16
[52] U.S. Cl. .......................... 345/168; 345/74; 345/167; 345/184; 250/227.22; 313/372; 379/368
[58] Field of Search .............................. 345/168, 74, 167, 345/184; 341/21, 22, 23; 313/309, 497, 372; 379/368; 250/227.22

[56] References Cited

U.S. PATENT DOCUMENTS

| | | | |
|---|---|---|---|
| D. 382,545 | 8/1997 | Imai et al. | D14/100 |
| 4,875,036 | 10/1989 | Washizuka et al. | 340/784 |
| 5,034,602 | 7/1991 | Garcia, Jr. et al. | 250/227.22 |
| 5,173,686 | 12/1992 | Fujihara | 340/700 |
| 5,189,632 | 2/1993 | Paajanen et al. | 364/705.05 |
| 5,224,151 | 6/1993 | Bowen et al. | 379/58 |
| 5,276,916 | 1/1994 | Pawlish et al. | 455/89 |
| 5,341,154 | 8/1994 | Bird | 345/167 |
| 5,347,197 | 9/1994 | Doyle et al. | 379/58 |
| 5,347,292 | 9/1994 | Ge et al. | 315/94 |
| 5,436,954 | 7/1995 | Nishiyama et al. | 345/74 |
| 5,448,133 | 9/1995 | Ise | 313/497 |
| 5,465,024 | 11/1995 | Kane | 313/309 |
| 5,584,054 | 12/1996 | Tyneski et al. | 455/89 |
| 5,689,824 | 11/1997 | Nagai | 455/89 |

*Primary Examiner*—Edward Lefkowitz
*Assistant Examiner*—Davetta Woods Goins

[57] ABSTRACT

A housing assembly for an ISDN multimedia capable wireless interface device having a plurality of operating capabilities. The housing assembly comprises a main housing, a cover, hinge assembly for coupling the cover to the main housing. The hinge assembly enables the cover to pivot and articulate relative to the main housing to transform the housing assembly into a plurality of mechanical configurations via sensors responsive to the pivoting and articulating of the cover provided in the housing assembly. The cover includes an illuminated keyboard having a display for selectively providing pixel-based graphics and light. The keyboard is disposed over the display when the device is operating in one of a plurality of operational modes. Each keypad of the keyboard has an image viewing surface and coherent light pipe mechanism for conducting light generated by the display to the image viewing surface the keypad. The upper rear surface of the main housing includes three unmarked softkeys which enable finger access for various device functions. The keys are software controlled and as such operate to provide a mouse, cursor control, number and text generation, video camera control and other like device features.

23 Claims, 5 Drawing Sheets

BACKLIGHTING SCHEME FOR A MULTIMEDIA TERMINAL KEYPAD

CROSS REFERENCES TO RELATED APPLICATIONS

The present application is a continuation-in-part of copending U.S. patent application Ser. No. 08/616,871, entitled MULTIMEDIA TERMINAL COVER HINGE, filed on Mar. 15, 1996, having one or more common inventors and is being incorporated herein by reference.

FIELD OF THE INVENTION

The present invention relates to electromechanical synergistically integrated systems and more specifically, to a multi-element housing assembly for an ISDN multimedia capable device that includes a keypad that can be illuminated for low light operation.

BACKGROUND OF THE INVENTION

The combining of multiple forms of media in the communication of data and information is commonly referred to in the art as multi-media. Multi-media allows communication through integrated forms of media such as audio, video, text, graphics, fax, and telephony, thereby providing a very powerful form of communication. By combining several forms of media, more effective communication can be accomplish when compared with a single media format such as text-based communication.

Many multi-media communication formats exist, however, such formats generally include voice communications, audio processing, data communications, image processing, and telecommunications using various networks such as Integrated Services Digital Network (ISDN).

Telecommunications via ISDN is a new concept in phone networking that has been designed to overcome the present public switched phone network's limitations. The public switched phone network in use today employs voice lines with very narrow bandwidths which limit the speed of data transmission, uses inefficient and expensive separate voice and data networks, has no standard out-of-band signaling system, and other problems. ISDN standardizes voice, data, and signaling, makes all transmission circuits end-to-end digital, adopts a standard out-of-band signaling system, and brings significantly more bandwidth to the desktop. This enables ISDN to provide substantial increases in the speed of dialing, desktop video conferencing, e-mail, collaborative computing, internet access at 128 Kbps, shared screen, and other services.

Devices which combine a couple of the aforementioned media communication formats, such as a computer and a telephone, into a single communication device have been developed. For example, in U.S. Pat. No. 5,189,632 entitled PORTABLE PERSONAL COMPUTER AND MOBILE TELEPHONE DEVICE issued to Paajanen et al. on Feb. 23, 1993, there is disclosed a handheld communication device which combines a computer with a telephone. The device has a folding double-sided keyboard with a set of buttons for operating the device as a telephone on one side and a second set of buttons on the opposite side for operating the device as a computer. The keyboard is hinged to the main housing of the device in such a manner that when the keyboard is unfolded from the main housing, a computer display screen is uncovered and the buttons for operating the device as a computer are accessible. When the keyboard is folded up against the main housing of the device, the keyboard partially covers the display screen and only the buttons for operating the device as a telephone are accessible.

In U.S. Pat. No. 5,276,916 entitled COMMUNICATION DEVICE HAVING A SPEAKER AND MICROPHONE issued to Pawlish et al. on Jan. 4, 1994, there is disclosed a handheld communication device which combines a radio with speaker-microphone in a folding housing assembly. One of the housing portions include the radio circuitry, the keypad, and the speaker. The other housing portion includes two microphones. The housing portions fold or unfold between first and second relative positions, with one of the positions providing a handset configuration and the other providing a speaker-microphone configuration. A position sensing switch determines the relative position of the housing portions in order to determine whether the device is in the handset configuration or speaker-microphone configuration. After sensing the configuration of the housing, a controller disposed in the device adjusts the gain of an audio amplifier according to the sensed configuration. The use of a position sensing switch in Pawlish et al. simplifies the operation of the device.

Other communication devices have been developed which include features that make the devices more user-friendly. In U.S. Pat. No. 5,436,954 entitled FOLDABLE RADIO TELEPHONE SET WITH ROTARY SELECTOR INTEGRAL WITH FOLDABLE HINGE ELEMENT issued to Nishiyama et al. on Jul. 25, 1995, discloses a portable radio telephone set contained in a folding housing. The telephone set includes a thumb rotatable telephone function selector that forms part of the housing hinge. The single rotatable function selector reduces the number of key buttons required for selecting the multiple telephone functions provided by the phone. U.S. Pat. No. 5,173,686 entitled SLIDING ACCOMMODATION TYPE LIQUID CRYSTAL DISPLAY DEVICE issued to Fujihara on Dec. 22, 1992, discloses a liquid crystal display unit which slides in and out of a housing. When the display unit is drawn out of the housing, it can be rotated to a predetermined viewing angle. The display unit includes a switches which sense the rotational angle of the display to automatically switch on or off the display. U.S. Pat. No. 5,224,151 entitled AUTOMATIC HANDSET-SPEAKERPHONE SWITCHING ARRANGEMENT FOR PORTABLE COMMUNICATION DEVICE issued on Jun. 29, 1993 to Bowen et al. and assigned to AT&T Bell Laboratories, the assignee herein, discloses a handset device which operates in both a handset and speakerphone mode. The device includes means for automatically switching between the two operating modes based on distance between the handset and the user's ear, this distance being determined by an infrared range detection unit built into the handset.

None of the devices described above combine more than two communication media formats into a single communication device and thus, fail to take full advantage of ISDN, Moreover, most of those devices do not have operating formats which can easily is be selected without the need to press or select various buttons and switches.

In response to the need for a user-friendly ISDN multimedia capable device, the assignee herein in the earlier mentioned U.S. patent application Ser. No. 08/616,871, describes an ISDN multimedia capable device that electronically changes functional states without a complex and confusing user interface process. The device described therein has a hinged keyboard cover which includes a multimedia terminal keypad. The keypad described therein can be illuminated for low light operation via a number of well known methods which include the use of a locally side mounted LED and light guide arrangement which operates to direct light to graphics on the outer layer of the keys. The LED and light guide arrangement described above and other like lighting methods require the use of relatively expensive and labor intensive wiring. The expense of such techniques increase significantly when the wiring must be routed through the two sets of hinges such as is the case in the multimedia device described in U.S. patent application Ser. No. 08/616,871. The multimedia device described therein includes two sets of hinges which provide a novel interconnected side hinge and keyboard cover motion that changes the functional state of the multimedia device.

Accordingly, the is a need for an illumination technique that enables low light operation of a keypad, especially a multimedia terminal keypad, which does not require the use of electrically active components that require expensive and labor intensive external electrical connections.

SUMMARY OF THE INVENTION

In accordance with the present invention, there is provided an illuminated keyboard for a multimedia terminal having display means for selectively providing pixel-based graphics and light. The keyboard is disposed over the display means when the multimedia terminal is operating in one of a plurality of operational modes. The keyboard comprises a plurality of keypads, each of the keypads having an image viewing surface and light pipe means for conducting light generated by the pixel-based graphics and light of the display means to the image viewing surface of each of the keypads.

Also in accordance with the present invention are finger access means disposed on the terminal for working within a selected one of the operating capabilities of the terminal via a user's hand.

DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for illuminating the keypad of a ISDN multimedia capable device, as shall be described with respect to this application, the methods and apparatus disclosed herein can be applied to the keypads of other multi-functional electronic devices as well.

The ISDN multimedia device described herein to which the illumination technique of the invention is generally directed, comprises a housing with a multielement mechanical cover hinge assembly that enables a multi-functional electronic device such as a multimedia terminal to quickly adapt to a range of substantially diverse physical and functional states, both in environment and user interface. The housing provides a simpler user interface process that otherwise would require a complex and confusing array of switches or keyed-in commands, mechanical add-ons and fixtures, to achieve a variety of user interface transformations. Moreover, the simplicity of user interaction in achieving multiple operational modes will allow the housing to be used in many new and existing applications and environments.

Figure 1A:
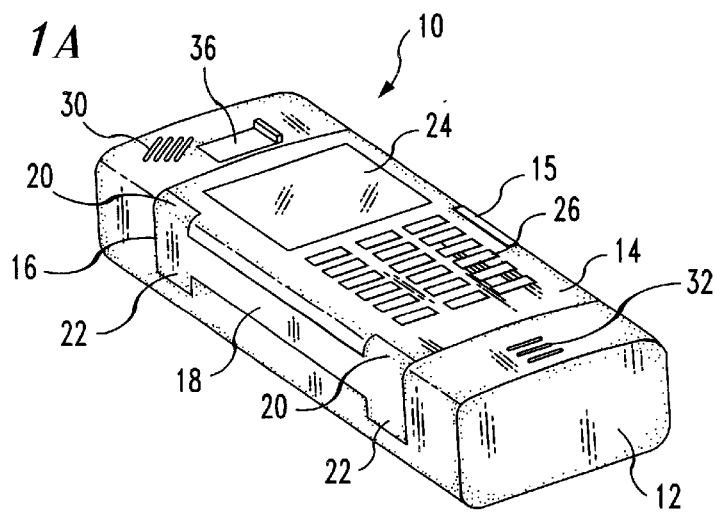
FIG. 1A is a perspective view of the MMT in a cellular mode format.
Figure 2A:
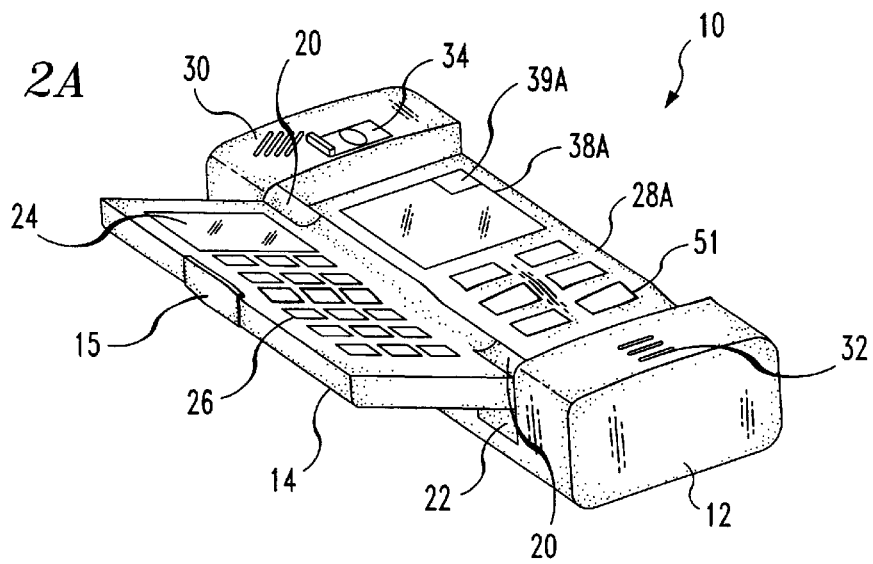
FIG. 2A is a perspective view of the MMT in a portrait format-multimedia mode.

Referring to FIGS. 1A and 2A, an embodiment of a multimedia terminal (MMT) 10 is shown. The various components of the MMT 10 are arranged in a three-component housing. The three components of the housing include a compact main housing 12 which is sized to be easily held in a user's hand like a conventional cellular telephone handset, a keyboard cover 14 and a side hinge assembly 16 that interconnects the keyboard cover 14 to the main housing 12. The MMT 10 is an advanced handheld communication terminal incorporating a wireless interface that includes the following features. As shown, the keyboard cover 14 includes a keyboard 26 which comprises an array of dome-shaped keypads 27. Each keypad 27 extends through an associated opening defined in the keyboard cover 14. As will be explained later, each keypad 27 has a plunger portion which enables the key pads to cooperate with a touch sensitive multimedia interface 28 (visible in FIG. 2A) that is located behind the keyboard cover 14 on the main housing 12. The plunger portion of each key also enables the touch sensitive multimedia interface 28 to be used to as a means for illuminating the keypads 27 as will be explained later on.

The multimedia touch sensitive interface 28 comprises a display with graphic matrix technology that allows pixel based images or text to be generated on the display. The display provides a high resolution graphics and video capability (video picture portions 38A and 39A) with high resolution still frame electronic imaging. A touch screen is laminated directly to the outer surface of the display as will be explained later. Such a configuration allows the use of a conventional liquid crystal display (LCD) display with backlighting or a self luminous cold cathode, cathode ray tube (CRT) display, as will be explained below. The cold cathode CRT is shown and described in U.S. Pat. No. 5,347,197 entitled DISPLAY DEVICE HAVING A DISPLAY TUBE INCLUDING A COLD CATHODE AND A CURRENT MIRROR DRIVE CIRCUIT FOR THE COLD CATHODE issued to Doyle et al. on Sep. 13, 1994, U.S. Pat. No.

5,347,292 entitled SUPER RESOLUTION COLD CATHODE FLOURESCENT DISPLAY issued to Ge et al. on Sep. 13, 1994, U.S., Pat. No. 5,448,133 entitled FLAT PANEL FIELD EMISSION DISPLAY DEVICE WITH A REFLECTOR LAYER issued to Ise on Sep. 5, 1995, and U.S. Pat. No. 5,465,024 entitled FLAT PANEL DISPLAY USING FIELD EMISSION DEVICES issued to Kane on Nov. 7, 1995. The pixel based display technology allows discreet and localized areas of the display to be illuminated and active rather than utilizing the whole display such that a window area 38A (FIG. 2A) can be created under the keyboard cover window 24 to display video or alpha numeric information to the user depending on the functional mode of the device at any given time.

The high resolution display 28 provided by either the cold cathode CRT or LDC back lighted display, combines high resolution graphics and touch screen sensitivity to achieve an advanced user entry interface. This provides the user of the MMT 10 with finger-tip access to a multilayered, menu driven, soft-key, note-pad-like user interface. A speaker 30 and a directional microphone 32 are provided in conventional locations on the main housing 12 to enable the MMT 10 to function as a standard cellular phone in closed modal acoustic mode. A shutter activated video camera 34 (FIG. 2A) is also provided in the main housing 12 in order to make two-way "live" electronic imaging through video screen portions 38A and 39A possible when the video camera 34 is operated in conjunction with the speaker 30 and microphone 32 in a video-speakerphone state via circuitry for adaptive modal and speakerphone speaker acoustics.

Figure 1B:
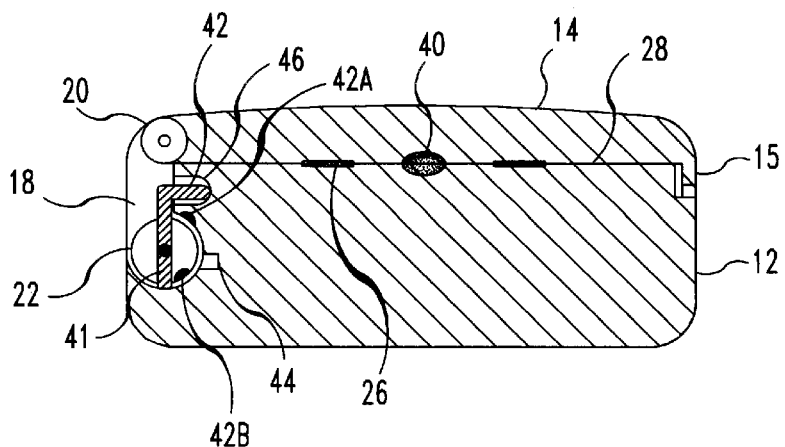
FIG. 1B is a cross-sectional view of the MMT in the cellular mode format.
Figure 2B:
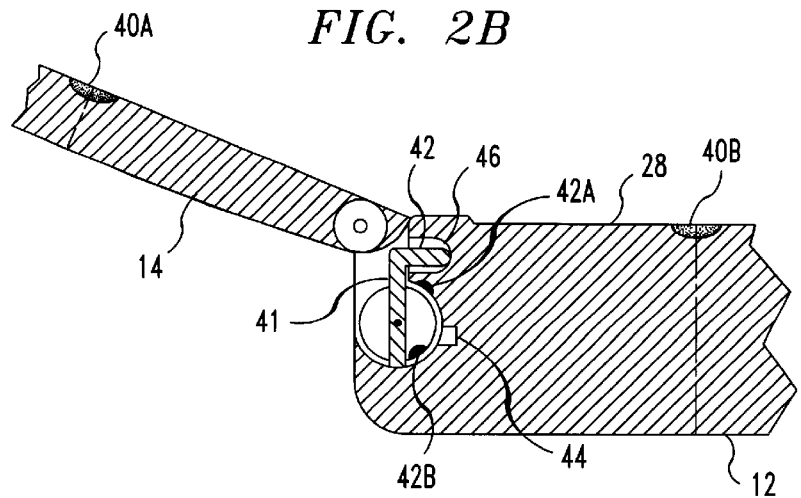
FIG. 2B is a cross-sectional view of the MMT in the portrait format-multimedia mode.
Figure 3A:
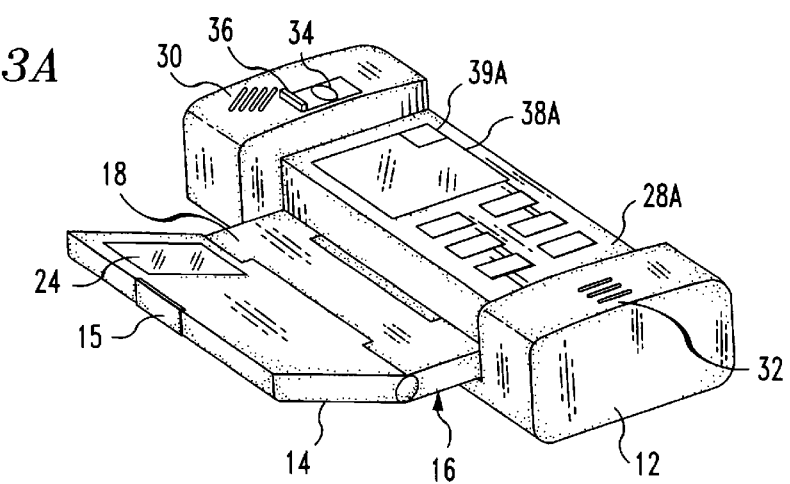
FIG. 3A is a perspective view of the MMT being transformed from the portrait format-multimedia mode to a landscape format-multimedia mode for tabletop applications as shown in FIG. 3B.
Figure 3B:
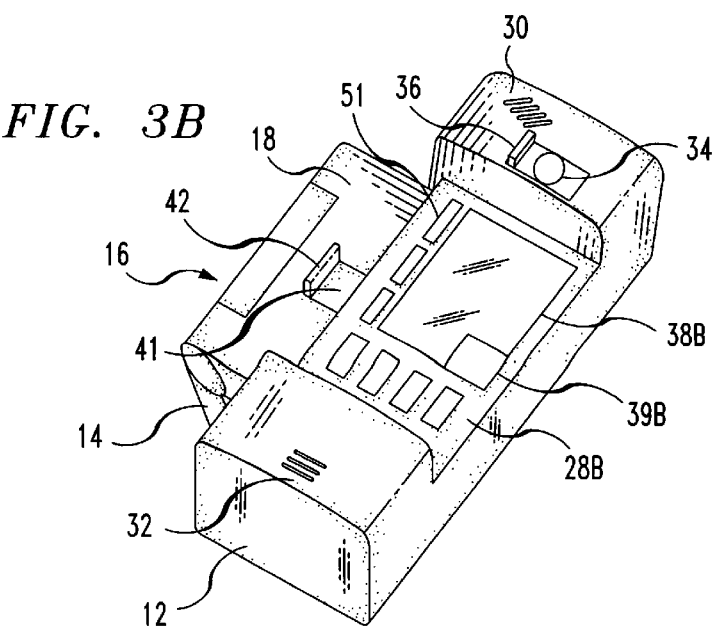
FIGS. 3C is a cross-sectional view of the MMT in the landscape format-multimedia mode.
Figure 3C:
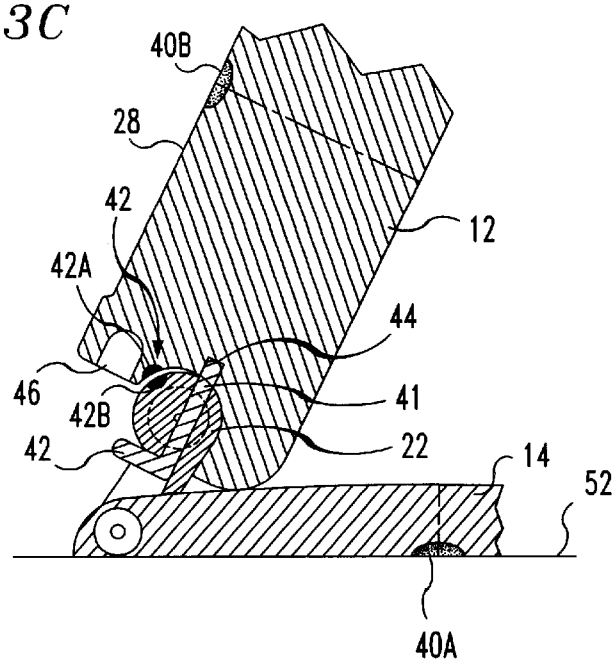

In FIGS. 1B, 2B and 3C, the housing contains a keyboard cover sensor 40 and a side hinge assembly sensor 42 to be described later in greater detail, which sense the opening and closing motion of the keyboard cover 14 and side hinge assembly 16. When the position sensors 40, 42 are activated by mechanical transformations of the housing, a P.C. based central microprocessor (schematically shown in FIG. 4 as element 50) contained within the main housing 12, initiates a plurality of programmed MMT functions which automatically switch the MMT 10 between the three primary usage modes consisting of a cellular phone mode, a video-speakerphone mode, and a multimedia model.

Referring again to FIGS. 1A and 2A, the mechanical transformations of the housing are made possible by the side hinge assembly 16 which is a two-hinge or double-articulating hinge arrangement that couples the keyboard cover 14 to the main housing 12 and enables the keyboard cover 14 to be used to activate the broad range of complex microprocessor controlled feature/function changes. The side hinge assembly 16 provides the motion paths necessary to achieve desired physical reconfiguring of the housing elements. The side hinge assembly 16 includes a side cover 18 with a side cover hinge arrangement 22 that couples the side cover 18 to the main housing 12 and a keyboard cover hinge arrangement 20 which couples the keyboard cover 14 to the side cover 18. The motions of the side hinge assembly 16 and keyboard cover 14 are sensed by the position sensors 40, 42 arranged in the housing.

The position sensors 40, 42 shown in FIGS. 1B, 2B, and 3C are preferably hall effect devices although other types of position sensors can be used such as electromechanical or optical position sensors. The keyboard cover sensor 40 includes a first magnetic element 40A embedded in the inner surface of the keyboard cover 14 and a second magnetic element 40B embedded in the main housing 12 adjacent to the multimedia touch screen. The side hinge assembly sensor 42 has a first magnetic element 42A embedded in the main housing 12 at location immediately adjacent to the side cover hinge 22 and a second magnetic element 42B embedded in the side cover hinge 22 itself. The mechanical motion of the side hinge assembly 16 and keyboard cover 14 activates the sensors 40 and 42, thereby causing the sensors to electrically signal the microprocessor to select the next sequential functional mode or user interface state for the MMT 10.

Figure 4:
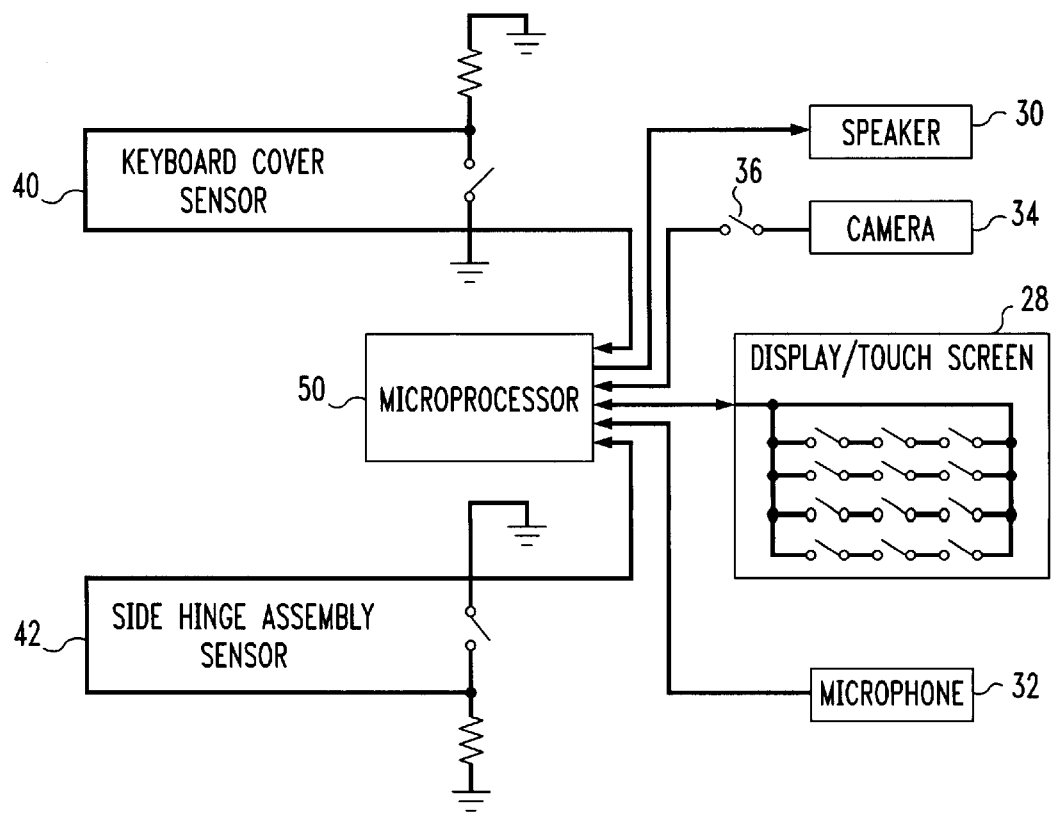
FIG. 4 is a schematic diagram depicting the controlling circuitry that enables the MMT to be selectively operated in various functional modes or user interface states.

The controlling circuitry for enabling the MMT 10 to be selectively operated in various functional modes or user interface states is schematically illustrated in FIG. 4. The controlling circuitry centers on the microprocessor 50 whose responsibility is to sort out the large number of possible user input commands and switch/sensor actuations. When the microprocessor receives a signal indicating the actuation of a switch/sensor, the microprocessor then must provide the appropriate response, e.g. with keyboard cover closed and the MMT in the cellular phone mode, pressing the keyboard dial keys, initiates the desired dialing sequence through activation of the microprocessor's dialing software. Thus, as shown the microprocessor 50 is coupled to and receives electrical signals from the keyboard cover sensor 40 and the side hinge assembly sensor 42. In response to the signals received by the microprocessor 50 from the keyboard and side hinge assembly sensors 40, 42 and the shutter 36 contained within the various housing components, the microprocessor 50 selectively actuates the multimedia display/touch screen 28, the video camera 34, the microphone 32 and the speaker 30 to select the various functional modes or user interface states of the MMT 10.

The different mechanical transformations of the housing activate a broad range of complex microprocessor controlled feature/functional changes. In FIG. 1A, the MMT 10 is mechanically configured in the cellular format. As can be seen in FIG. 1B, this format orients the keyboard cover sensor elements 40A, 40B in opposing relationship with each other thereby signaling the microprocessor to electrically configure the MMT 10 to operate in the cellular phone mode. In the cellular phone mode shown in FIG. 1A and 1B, the keyboard cover 14 and side hinge assembly 16 are folded against the main housing 12. A conventional push-button style locking arrangement 15 secures the keyboard cover 14 such that the side hinge assembly 16 and keyboard cover 14 wrap around the main housing 12 to produce the appearance of a conventional cellular telephone. The housing of the MMT 10 and the user interface 26 located on the keyboard cover 14 which forms front exterior surface of the MMT 10, allows the MMT 10 to duplicate the display and key functions of a standard cellular phone. The MMT 10 in this state provides a comfortable user interface 26 which is like present conventional cellular key layouts. This is accomplished as earlier explained by adapting the keypads 27 on the keyboard cover 14 to make physical contact with the high resolution touch screen display 28 located directly under the keyboard cover 14 via an integral plunger element. Thus, when the keyboard cover 14 is closed which causes the MMT 10 to operate in the cellular mode wherein the speaker 30 and microphone 32 operate in a conventional handset acoustical mode, the display 28 and keypad 26 provide call service in an apparent manner consistent with a conventional cellular phone. The user, therefore, is unaware that the keypad 27 are actually contacting the touch screen 28 located directly below such that pressing a key activates the touch screen display 28.

When the MMT is mechanically configured in the cellular format it may also be operated in a near talking-speakerphone acoustical mode. In order to switch from the handset acoustical mode to the speakerphone acoustical mode, the user merely activates one of the external keypads 27 located on the keyboard cover 14 which causes the microprocessor to engage the adaptive speaker volume control and the directional microphone 32 and speaker 30. The user then places a voice call through the other external keypads 27 located on the keyboard cover 14. Alternatively, the MMT 10 can include an infrared range detection unit for automatically selecting the speakerphone acoustical mode. Such a detection unit automatically switches the MMT between the handset acoustical mode and the speakerphone acoustical mode by using infrared light to determine when the MMT is respectively placed at or away from the user's ear. Such automatic speakerphone operation using infrared range detectors is discussed in greater detail in U.S. Pat. No. 5,224,151 entitled AUTOMATIC HANDSET-SPEAKERPHONE SWITCHING ARRANGEMENT FOR PORTABLE COMMUNICATION DEVICE issued on Jun. 29, 1993 to Bowen et al. and assigned to AT&T Bell Laboratories, the assignee herein. Accordingly, the entire disclosure of U.S. Pat. No. 5,224,151 is incorporated herein by reference. In any case, if a user wants to activate the live two-way video feature the user can accomplish this by opening a sliding camera lens vanity cover or shutter 36 which covers the video camera lens (opening of the shutter will also automatically engage the speakerphone acoustical mode if the MMT is not already operating in this mode). The opening of the cover 36 causes the microprocessor to initiate a two-way video link between both parties (when the call has been connected and accepted). The two-way live video image is viewed through a window 24 located in the keyboard cover 14. The two-way video image feature combined with the adaptive speaker volume control and the directional microphone and speaker allows the user to hold the device away from the head and have both voice and video conferencing capability.

FIGS. 2A and 2B show the MMT 10 mechanically transformed into the portrait format which initiates MMT operation in the multimedia mode which also supports the previously described video-speakerphone operating mode. This is accomplished by pressing the lock button 15 which releases the keyboard cover 14 from its locked position in the cellular format, and pivoting the key board cover 14 via the keyboard hinge 20, away from the main housing 12 to reveal the high resolution multimedia display and touch screen 28. The action of pivoting the keyboard cover 14 away from the display 28 separates the magnetic elements 40A and 40B of the keyboard cover sensor 40. The microprocessor detects the changed position of the magnetic elements 40A and 40B and maintains the initial "portrait" orientation of the display 28, the camera 34, and the video-speakerphone operation, but changes the MMT 10 to a multimedia mode of operation thereby creating a multimedia terminal with display graphics and touch screen oriented in a portrait format shown in FIG. 2A with the video screen portions oriented as shown at 38A and 39A.

Referring to FIGS. 3A and 3B, the MMT 10 is shown mechanically transforming into a configuration for tabletop applications which provides multimedia mode operation with a display and camera orientation in a landscape format. The tabletop/landscape format is initiated when the user fully pivots the keyboard cover 14 via the keyboard cover hinge 20 away from the display to a point where the keyboard cover 14 engages a finger tab 42 of a side cover hinge locking pin 41. The keyboard cover 14 and side cover 18 then pivot together approximately 90 degrees via the side cover hinge 22 thereby articulating the keyboard cover 14 around the side of the main housing 12 to a position behind the main housing 12 where the side cover hinge locking pin 41 enters a groove 44 thereby automatically locking the side cover 18 into position. When the locking pin 41 is in the groove 44 the keyboard cover 14 pivots again around the keyboard cover hinge 20 until the keyboard cover 14 contacts the main housing 12 wherein the keyboard cover 14 now serves as a stand for the MMT 10. The keyboard cover 14 having pivoted approximately 300 degrees, allows the display 28 to be inclined at an angle of approximately 60 degrees from the support surface 52 to optimize the display's viewing angle. When the MMT 10 is in the tabletop format, the center of gravity for the main housing 12 is well past vertical and inherently unstable. More specifically by locking the side cover 18 relative to the main housing 12 with the side cover hinge locking pin 41, the main housing 12 is vertically unstable and free to rotate about the keyboard cover hinge 20. However, the articulating arrangement of the side hinge assembly 16, allows the locked together main housing 12 and side cover 18 to freely rotate backwards until a 3 point contact geometry is established with the inverted keyboard cover 12. This provides a housing geometry which is compressive in nature and kinematically stable.

Regarding the locking pin 41, it should be understood that other commercially available means for locking the side cover 18 in the tabletop format can be used in place of the shown cover hinge locking pin and groove arrangement. For example, such means could include hinge slide-locking devices, hinge torque controlling devices or other hinge locking-pin devices. Alternatively, the use of dead-stop surfaces or interlocking notches and teeth in the relevant housing components could also be employed for locking the housing components in a triangular configuration and producing a stable tabletop format.

Although the preferred angular orientation of the display surface to the user is approximately 60 degrees, any other suitable angular orientation can be selected if desired. The angular orientation is controlled by the relationship between the hinge axis separations, and the point-of-contact between the back-rotated keyboard cover 14 and the side hinge cover locking pin 41. The positions and angles can be optimized for the individual devices range of desirable viewing angles.

In FIG. 3C, as the side cover 18 is pivoted 90 degrees to the locked tabletop format, the circumferentially space-apart side hinge assembly sensor elements 42A, 42B become oriented into an opposing relationship. This causes the side hinge assembly sensor 42 to produce a signal which is received by the microprocessor and indicates that the MMT 10 is in the tabletop format. In response to these signals, the microprocessor initiates a programmed response that electronically rotates the camera and display output so that the camera and display will provide the correct video screen orientations 38B and 39B for an assumed tabletop application as shown in FIGS. 3A and 3B. The display 28 and the camera 36 must be electronically rotated together to maintain the correct user orientation format. The activation of the side hinge assembly sensor 42 will also instruct the microprocessor to change the microphone/speaker response from the near talking mode to a far talking mode which is suitable for tabletop speakerphone applications.

A permanent softkey 51 (software controlled) suitably placed on the display activates a manual override program for the screen and camera orientation. Each key press rotates the camera and display/touch screen 90 degrees, providing a manual override of the camera/screen orientation by the user. A gravity sensing device could be optionally used to initiate automatic rotation of the display/camera when the device is held or positioned in the difference orientations.

The MMT 10 can be returned to any of the prior formats by pressing the tab 42 of the side cover hinge locking pin 41 to disengage the pin from the groove 44. Once the pin 41 is disengaged from the groove 44, the keyboard cover 14 and side hinge assembly 16 can be freely pivoted into any of the previous formats described above.

The hybrid of controlled mechanical housing component motion and interconnected microprocessor activity, allow the MMT 10 to achieve multiple usage modes in a small handheld package. Sensor initiated automatic software responses from the on board microprocessor allow for significant reductions in complexity, allowing the user to optimize the functionality of the housing in its different configurations.

Figure 5:
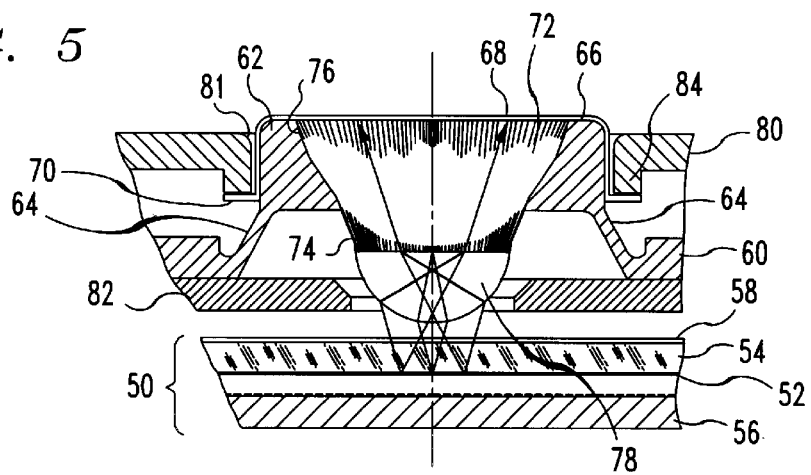
FIG. 5 is a cross-sectional view through one of the dome-shaped keypads of a first embodiment the invention.

Referring to now FIG. 5, a preferred embodiment of the keypad illumination technique of the invention is shown. The illumination technique of the invention uses the pixel based display technology of a cold cathode CRT display 50 to selectively illuminate discreet and localized areas of the display although a LCD with backlighting can be used in other embodiments of the invention. It should be noted, however, that the use of a cold cathode CRT display 50 in the preferred embodiment with its individual pixel addressability, allows only the individual pixels needed to be illuminated, thus the power draw for illumination is only for the pixels which are turned on. This represents a substantial electric power saving over LCD back lighting schemes which require the back light to turned on fully for any application. The cold cathode CRT display 50 consists of a graphical imaging layer 52 which is disposed between a first glass plate layer 54 and a second glass plate layer 56. A substantially transparent touch screen 58 is laminated to the first glass plate layer 54 of the display 50.

FIG. 5 depicts one of the dome-shaped keypads of the preferred embodiment of the invention. The keypad 62 extends through an associated keypad opening 81 defined in the outer wall 80 of the keyboard cover. The keypad 62 is made from a non-clear inexpensive polymer material such as rubber or the like. The keypad 62 has an elastically deformable side wall 64 that extend down and away at angle from the sides of the keypad 62 and integrally connect the keypad 62 to a keyboard substrate 60 which is disposed between an outer wall 80 and an inner wall 82 of the keyboard cover 80. Such a construction allows the keyboard 60, which is preferably made from the same material as the keypad 62, to be inexpensively constructed. An image viewing layer 66 defining a graphics image viewing surface 68, extends over the upper surface of the keypad 62 and partially down the sides of the keypad 62. The image viewing layer 66 includes a outwardly extending circumferential flange 70 which engages a downwardly extending lip 84 that defines the keypad opening 81 in the outer wall 80 of the keyboard cover. The flange 70 operates to prevent the image viewing layer 66 from falling out through the opening 81 in the keyboard cover. The bottom of the keypad 62 includes a tapered plunger portion 72 and imaging lens 78 which contacts the touch screen 58 laminated to the display 50 when the MMT is configured in the cellular mode. When finger pressure is applied to the image viewing layer 66 of the keypad 62, the side wall 64 resiliently deflects to allow the keypad 62 to move downwardly so that the free end of the imaging lens 78 engages the touch screen 58 to operate the MMT in a standard cellular phone mode. The downward movement of the keypad 62 disengages the image viewing layer flange 70 from the lip 84 of the keyboard cover opening 81. Upon the release of the keypad 62, the wall 64 return the keypad 62 to its original position where the flange 70 of the image viewing layer 66 engages the lip 81 around the keypad opening 81.

The pixels of the display which are locally active and illuminated directly under the plunger portion 72 and the imaging lens 78 of the keypad 62 (see FIG. 8C) create a graphical image in the form of a letter, number, or icon. The graphical image is conducted from the display 58 to the image viewing layer 66 of the keypad 62 by the plunger portion 72 and the imaging lens 78 of the keypad 62. Imaging lens 78 focuses the graphical image on to the receiving surface of the plunger portion 72 which operates as an imaging light pipe. In the preferred embodiment of FIG. 5, the plunger portion 72 or imaging light pipe of the keypad 62 comprises a coherent tapered plastic fiber optic bundle having a tapered drawn light receiving end 74 and a full diameter undrawn light output end 76. The full diameter undrawn end 76 of the coherent fiber bundle is integrally molded into the keypad 62. An aspheric focusing lens 78 is bonded to the end surface of the tapered drawn end 74 of the coherent fiber optic bundle to focus graphical light images produced by the display 50 into the tapered light receiving end 74 of the coherent fiber optic bundle. The focused graphical light image is conducted by the coherent fiber optic bundle to the image viewing layer 66 of the keypad 62 where it can be viewed on the graphics image viewing surface 68. This arrangement allows the coherent fiber optic bundle 72 to be physically separated from the image viewing layer 66 wherein only the lens 78 contacts the touch screen 58 of the display 50 when the keypad 62 is pressed. It should be understood, however, that the focusing lens 78 can be omitted if desired although this would render the conducted image softer and thus, somewhat less legible depending on distance the light receiving end of the coherent fiber optic bundle is separated from the image surface of the display.

In order to allow the light conducted by the fiber optic bundle to be seen at the graphics image viewing surface 68, the image viewing layer 66 of the keypad 62 is preferably a clear polymer which allows light emitted from the full diameter undrawn end 76 of the coherent fiber optic bundle 72 to be conducted therethrough. Colored polymers which allow light sufficient conduction can also be used if desired.

The image quality of the conducted image can be controlled by the size of the fiber optic bundle, the magnification ratio of the undrawn to drawn end of the fiber optic bundle, the pixel size and spatial resolution of the display and thickness of any intermediary transparent material between the pixel surface and the light receiving end of the coherent fiber optic bundle.

The graphic matrix technology of the display allows any character or number in any language to be generated and via the tapered fiber optic bundle, conducted to the surface of the keypad for user interface so the keyboard becomes user selectable as a graphical softkey.

Figure 6:
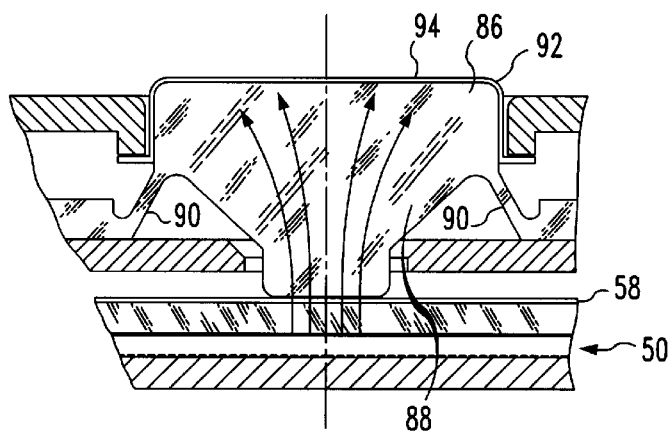
FIG. 6 is a cross-sectional view through one of the dome-shaped keypads of a second embodiment of the invention.

Referring to FIG. 6, a second embodiment of the keypad illumination technique of the invention is shown. The illumination technique of the invention also uses the pixel based display technology of a cold cathode CRT display 50 but instead of using the display pixels as a graphics source as in the previous embodiment, the display pixels are used as a light source to selectively illuminate printed indicia on an image viewing layer of the keypads. The display pixels which are locally active and illuminated are located directly under the plunger portion of each keypad, are used to create individual and color selectable back lighting sources for the keys.

In the second embodiment, the keypad 86 is constructed as described in the previous embodiment. However, in the second embodiment, a tapered plunger portion 88 or light pipe which is unitary with the rest of the keypad 86 is provided and is always in slight contact with the touch screen 58 of the display 50 when the keyboard cover is closed in the cellular mode. When finger pressure is applied to the image viewing layer 92 of the keypad 86, the arms 90 of the keypad resiliently deflect to allow the keypad 86 to move downward slightly so that the free end of the plunger portion 88 which is engaged with the touch screen 58, exerts a pressure thereon. In order to conduct light created by the display 50, the entire keypad 86 including the plunger portion 88, is preferably made from a clear polymer material such as a clear rubber, which allows maximum light conduction to the image viewing layer 92 of the keypad 86. The graphics image viewing surface 94 of the image viewing layer 92 in the second embodiment includes a printed graphic (not shown) such as a letter, number or icon.

In the second embodiment of the invention, the lighting intensity is controlled via by the number of pixels which are activated in the display 50. Alternatively, the lighting intensity can be controlled through the transmission level of the display itself.

Figure 7:
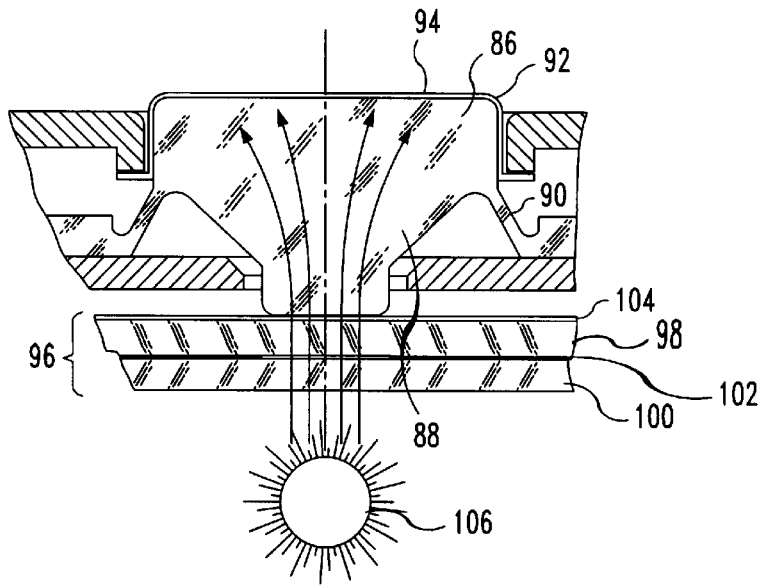
FIG. 7 is a cross-sectional view through one of the dome-shaped keypads of a third embodiment of the invention.

Referring to FIG. 7, a third embodiment of the keypad illumination technique of the invention is depicted. The third embodiment employs the same keypad construction as described in the second embodiment, however, a conventional touch sensitive LCD display 96 with backlighting is used in place of the cold cathode CRT display for the multimedia touch sensitive interface. Such displays are well known and typically comprise an image layer 102 disposed between a first glass plate layer 98 and a second glass plate layer 100. A touch sensitive screen 104 is laminated directly to the first glass plate layer 98 and a light source 106 is located under the second glass plate layer 100 of the display 96. As described in the second embodiment, each dome-shaped keypad 86 of the third embodiment includes a n integrally formed plunger portion 88 made from a clear polymer material which allows light to travel through the plunger to the graphics image viewing surface 94 of the image viewing layer 92. The graphics image viewing surface 94 of each keypad 86 includes indicia in the form of a letter, number, icon or the like which printed or otherwise applied thereto. When light is conducted up through the plunger 88, the image viewing layer 92 becomes illuminated around the indicia.

Figure 8C:
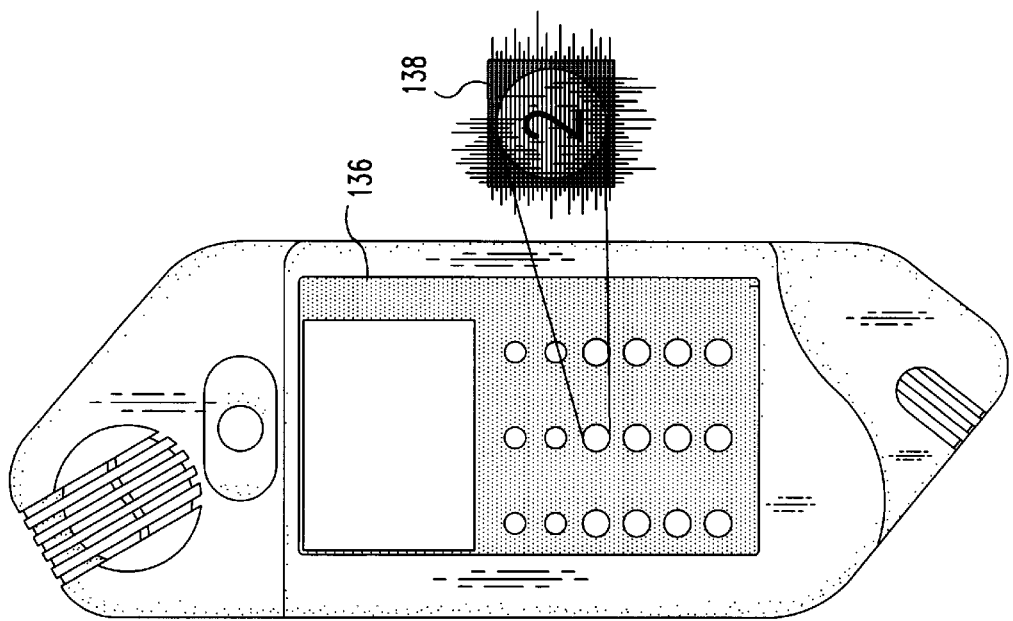
FIG. 8C is a top plan view of the MMT of FIG. 8A with the keyboard cover removed.
Figure 8B:
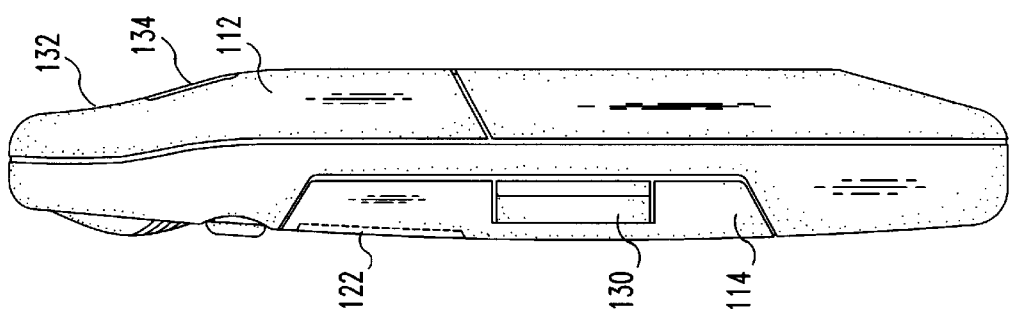
FIG. 8B is a side view of the MMT of FIG. 8A.
Figure 8A:
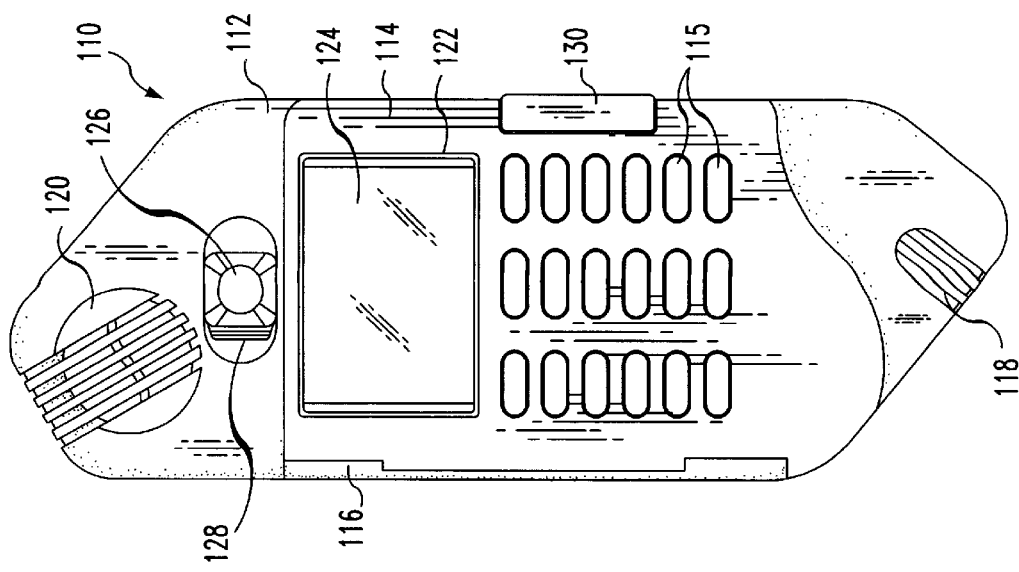
FIG. 8A is a top plan view of a second embodiment of the MMT.

Referring to FIGS. 8A–8C, another embodiment of the MMT is shown and is designated 110. The MMT 110 is shown in FIGS. 8A and 8B in the cellular format. The MMT 110 includes a main housing 112, a keyboard cover 114 with keypads 115 extending therethrough, and a side hinge assembly 116 that interconnects the keyboard cover 114 to the main housing 112. A directional microphone 118 and speaker 120 are located as shown in the main housing 112. The keyboard cover 114 includes keyboard cover window 122 which allows a video portion 124 of an underlying display to be viewed therethrough. A video camera lens 126 for the live two-way video feature and shutter 128 are provided in the main housing 112. A push-button style lock 130 for unlocking the keyboard cover 114 from the main housing 112 is also provided.

As shown in FIG. 8B, the upper rear surface 132 of the main housing 112 includes three unmarked softkeys 134 (only one visible). The positioning of the keys 134 is to enable finger access in the hand held cellular mode and tabletop modes of operation for various terminal functions. The keys 134 are software controlled and as such operate to provide a mouse, cursor control, number and text generation, video camera control and other like terminal features. The keys 134 can also be graphically represented on the display to represent function options to aid in user familiarity.

FIG. 8C shows the MMT 110 without the keyboard cover 114 attached to illustrate the display 136 and its graphic matrix technology which allows pixel based images 138 or text to be selectively generated thereon under corresponding keypads 115 (FIG. 8A) to illuminate the keypads 115.

Numerous modifications and alternative embodiments of the invention will be apparent to those skilled in the art in view of the foregoing description. Accordingly, this description is to be construed as illustrative only and is for the purpose of teaching those is skilled in the art the best mode of carrying out the invention. Details of the structure may be varied substantially without departing from the spirit of the invention and the exclusive use of all modifications which come within the scope of the appended claims is reserved.

What is claimed is:

1. An illuminated keyboard for a multimedia terminal having a display for selectively providing graphics and light, said keyboard disposed over the display when the multimedia terminal is operating in one of a plurality of operational modes, said keyboard comprising:

a plurality of keypads, each of said keypads having an image viewing surface and a coherent fiber-optic bundle for conducting light generated by the pixel-based graphics and light of the display to said image viewing surface of each of said keypads.

2. The illuminated keyboard as recited in claim 1, wherein said coherent fiber-optic bundle includes a tapered drawn light receiving end and a full diameter light output end.

3. The illuminated keyboard as recited in claim 2, wherein said image viewing surface includes indicia disposed thereon.

4. The illuminated keyboard as recited in claim 3, wherein said coherent fiber-optic bundle conducts pixel-based light selectively generated by the display to said image viewing surface of each of said keypads to illuminate said indicia.

5. The illuminated keyboard as recited in claim 4, wherein said coherent fiber-optic bundle is clear.

6. The illuminated keyboard as recited in claim 2, wherein at least one of said plurality of keypads further comprises a focusing lens disposed between said tapered drawn light receiving end of said coherent fiber-optic bundle and the display, said lens and said coherent fiber-optic bundle conducting a pixel-based graphic selectively generated by the display to said image viewing surface of each of said keypads.

7. The illuminated keyboard as recited in claim 1, wherein the display comprises a liquid crystal display having a backlighting source.

8. The illuminated keyboard as recited in claim 1, wherein the display comprises a cold-cathode, cathode ray tube.

9. A housing assembly for a multimedia capable wireless interface device having a plurality of operating capabilities, said housing assembly comprising:

a main housing including display means for selectively providing pixel-based graphics and light;

a cover;

hinge means for coupling said cover to said main housing, said hinge means enabling said cover to pivot and articulate relative to said main housing to transform said housing assembly into a plurality of mechanical configurations, wherein an appropriate one of the operating capabilities of the device is automatically selected in response to said mechanical configuration of said housing assembly;

finger access means disposed on said main housing for working within a selected one of the operating capabilities of the device via a user's hand; and an illuminated keyboard in said cover, said keyboard including a plurality of keypads, each of said keypads having an image viewing surface and a coherent fiber-optic bundle for conducting light generated by the pixel-based graphics and light of the display means to said image viewing surface of each of said keypads.

10. The housing assembly as recited in claim 9, wherein said display means graphically indicates the function of said finger access means for a selected one of the operating capabilities of the device.

11. The housing assembly as recited in claim 9, wherein said selected one of the operating capabilities of the device includes a cellular phone operating mode.

12. The housing assembly as recited in claim 9, wherein said selected one of the operating capabilities of the device includes a multimedia operating mode.

13. The housing assembly as recited in claim 9, wherein said coherent fiber-optic bundle includes a tapered drawn light receiving end.

14. The housing assembly as recited in claim 13, wherein said image viewing surface includes indicia disposed thereon.

15. The housing assembly as recited in claim 14, wherein said coherent fiber-optic bundle conducts pixel-based light selectively generated by the display means to said image viewing surface of each of said keypads to illuminate said indicia.

16. The housing assembly as recited in claim 15, wherein said coherent fiber-optic bundle is clear.

17. The housing assembly as recited in claim 9, wherein said fiber-optic bundle has a tapered drawn light receiving end and an undrawn full diameter light output end.

18. The housing assembly as recited in claim 9, further comprising light focusing means disposed on an end of said fiber optic-bundle.

19. The housing assembly as recited in claim 9, wherein the display means comprises a liquid crystal display having backlighting source.

20. The housing assembly as recited in claim 9, wherein the display means comprises a cold-cathode, cathode ray tube.

21. The illuminated keyboard as recited in claim 1, wherein said display means further comprises a touch screen, said touch screen producing a signal in response to contact between said touch screen and each of said keypads.

22. The housing assembly as recited in claim 9, wherein said display means further comprises a touch screen, said touch screen producing a signal in response to contact between said touch screen and each of said keypads.

23. A method of providing an illuminated keyboard for a device having a plurality of operating capabilities, said method comprising the steps of:

providing a pixel-based graphics display which generates light, the display further including a touch sensitive screen;

providing a keyboard said keyboard including a plurality of keypads, each of said keypads having an image viewing surface and a translucent coherent fiber-optic bundle;

conducting light generated by said pixel-based graphics display to said image viewing surface through said translucent coherent fiber-optic bundle; and producing a signal in response to contact between each of said keypads and said touch screen.

* * * * *